Patented Dec. 17, 1929

1,739,839

UNITED STATES PATENT OFFICE

PETER JUNG, OF BERLIN-NEUKOLLN, GERMANY

PROCESS OF AGGLOMERATING ORE, MINERAL, OR OTHER MATTER AND THE PRODUCT PRODUCED THEREBY

No Drawing.   Application filed July 5, 1923.   Serial No. 649,727.

My invention relates to improvements in the process of agglomerating ore, mineral, or other matter which by reason of its granular or other physical state or by reason of its properties can not be agglomerated by known processes. I have found that such matter which by processes now in use can not be formed into bricks is readily pressed by comparatively low pressure into bodies of high strength by adding thereto more or less of a suitable substance ground in water into a slimy dispersion. By adding the said dispersion to the matter and pressing the same, in some cases at slightly elevated temperature, bodies are obtained which have a high resistance to external pressure and which can be subjected to various operations and more particularly to metallurgical processes. For producing a good agglomeration it is not necessary to use a slimy dispersion which is chemically the same as the matter to be agglomerated. It may be stated as a general rule that any dispersion of a solid body ground into slimy consistency can be used as a binding medium, so that there is perfect independence in the selection of the binding medium, and the composition of the binding medium and the matter to be agglomerated can be selected with reference to the further treatment of the matter.

Though any matter adapted for use in my improved process can be transformed into a slimy dispersion, yet it will be understood that some raw products are more suitable than others. For example, the hydrates of silicic acid, alumina, iron oxid, alumina silicate, and some fuels can be transformed into slimy dispersions by the use of a small amount of power, and small amounts thereof (relative to the material to be agglomerated) have strong binding power. I have discovered that when pressing raw material having such dispersions added thereto a large proportion of the water contained in the raw mixture is rapidly pressed out, even in such cases in which the raw material as such resists more or less to the separation of the water. The water can more thoroughly be separated by subjecting the matter during the pressing operation to a treatment by electric current, by connecting the plunger and the pressure plate cooperating therewith to opposite poles of a suitable source of electric energy. Probably by the action of the electric current the colloidal state of the slimy dispersion is destroyed so that the colloidally held water is set free.

The process is particularly important for briquetting fragile ore, minette, ore of granular character such as magnetic iron ore, flue dust, and the like. Furthermore, the process can be used for making bricks from sand as a raw material, in which case I prefer as a binding medium hydrated aluminum silicate transformed by grinding into a slimy oil like substance.

In the practice of the invention I have discovered that the strength of the bricks increases in proportion to the degree of fineness of the matter to be agglomerated, which may be explained by the fact that the colloidal slimy dispersion acts not only by filling out the interstices between the grains, but also as a gluing medium. As far as gluing action is concerned the surface tension of the colloidal dispersion surrounding the individual grains is higher where the grains are small and the dispersion is distributed over a large surface. It follows that the force binding the grains of the brick is increased accordingly. This however, can be the case only if the binding medium is in the state of a gel, because only gels have the property of binding the fine and finest particles by gluing.

Therefore, good results are obtained by transforming the colloidal sol to be used for binding the raw material into the state of a gel, after mixing the same with the raw material, which may be done in any known or preferred way, for example by causing electric currents or electrolytes to act on the bricks being pressed.

Such electrical treatment may act by causing the discharge of the electrically charged colloid particles of the dispersion, or it may produce coagulation by generating a counter-colloid. For example, when passing electric current through a colloidal dispersion of coal in the presence of soluble iron or magnesium compounds the coal moves in the direction of the negative current, and the iron or magnesium hydroxid moves in the direction of the positive current. Any preferred means may be used for coagulating the gel, but in any case it is important that the formation of the gel takes place only after mixing and when pressing the mixture. The water is effectively separated, and most of the raw materials are formed into bricks by a pressure of from 600 to 800 kilogrammes per square centimeter, which bricks answer to the highest requirements.

In carrying out the process I insulate one or both of the plungers of the press and I connect the same to one or both terminals of a source of electric energy, so that while being pressed the raw material is subject to the coagulating action of the current, the raw material being in some cases decomposed by additions of a chemical character.

As specific examples of modes of carrying out the invention the following are given:—

1. Clay is made up into a slurry with water, in proportions as to form a mass of a somewhat viscous mixture, having a consistency resembling lubricating oil. With this is well mixed, such an amount of flue dust from a blast furnace (or other metal-containing substance) as will form a paste. This mixture is well agitated or kneaded, in order to thoroughly coat the particles. The paste is then put into a press, of which the plunger is electrically insulated, and is subjected to simultaneous action of a direct electric current and to pressure up to 600 or 800 atmospheres, the water being forced out through a common filter cloth. The product can then be further dried, if desired can be broken up into pieces and smelted in a blast furnace.

2. Ore of a fragile nature, which on that account cannot readily be treated in a blast furnace, is crushed preferably to a fine powder. This is mixed with a suspension of hydrated alumina, and treated as in Example 1.

3. Ore and coal, in admixture, can be powdered and briquetted as in Example 1. The coal can serve as reducing agent in the later metallurgical operation.

4. One part of the ore to be briquetted can be ground with water, into the form of a substantially colloidal slime. Such slime can be used in place of the slurry of clay or of hydrated alumina in the above examples.

I claim:

1. The process of briquetting raw material which comprises mixing the raw material with an adhesive comprising a colloidal dispersion of a material which material does not normally when not in the colloidal state, possess binding or adhesive properties.

2. The process of briquetting raw material which comprises mixing the raw material with an adhesive comprising a colloidal dispersion of a material which material does not normally when placed in contact with water form a colloid and which does not possess normally binding or adhesive properties.

3. The process of briquetting raw material which comprises mixing the raw material with an adhesive comprising a material ground to a colloidal condition, which ground colloidal material does not possess binding or adhesive properties when not ground to the colloidal condition but which exhibits such properties when ground to the colloidal condition.

4. The process of briquetting raw material which comprises mixing the raw material with an adhesive comprising a colloidal dispersion of a material which material does not normally when placed in contact with water form a colloid and which does not possess normally binding or adhesive properties and thereafter coagulating the colloid.

5. The process of briquetting raw material which comprises mixing the raw material with an adhesive comprising a material ground to a colloidal condition, which ground colloidal material does not possess binding or adhesive properties when not ground to the colloidal condition but which exhibits such properties when ground to the colloidal condition and thereafter coagulating the colloid.

6. The process of briquetting raw material which comprises mixing the raw material with an adhesive comprising a material ground to a colloidal condition, which ground colloidal material does not possess binding or adhesive properties when not ground to the colloidal condition but which exhibits such properties when ground to the colloidal condition, pressing the mixture and simultaneously subjecting the same to the action of an electric current.

In testimony whereof I hereunto affix my signature.

PETER JUNG.